United States Patent [19]

Gold

[11] Patent Number: 4,811,519

[45] Date of Patent: Mar. 14, 1989

[54] AUTOMOTIVE WINDOW MOUNTING ASSEMBLY

[76] Inventor: Peter N. Gold, 465 North Wood Road, Rockville Centre, N.Y. 11570

[21] Appl. No.: 215,270

[22] Filed: Jul. 5, 1988

[51] Int. Cl.[4] .................................................. E05F 11/38
[52] U.S. Cl. ........................................ 49/375; 49/351; 49/502
[58] Field of Search ................ 49/374, 375, 376, 377, 49/502, 350, 351

[56] References Cited

U.S. PATENT DOCUMENTS

| | | | |
|---|---|---|---|
| 1,641,157 | 9/1927 | Cook | 49/377 |
| 3,252,256 | 5/1966 | Sprecher | 49/374 X |
| 3,584,415 | 6/1971 | Keefe et al. | 49/374 X |

Primary Examiner—Philip C. Kannan
Attorney, Agent, or Firm—Collard, Roe & Galgano

[57] ABSTRACT

An assembly for mounting a window panel adapted to be raised and lowered by a mechanism is mounted within a automobile door. The automobile door is of the type having a peripheral frame extending upwardly from the window line of the door. The peripheral frame is adapted for supporting the outer periphery of the window panel when the window is in a fully raised position. The apparatus includes a window panel receiving element which is placed along the bottom of the window and has a pair of opposed sides having a first end thereof adapted to be fixed attached to the inside and outside surface of the window panel. The receiving element has a second end having a pair of downwardly extending leg portions adapted to resiliently engage a window engagement element on the mechanism for raising and lowering the window panel, thereby coupling the window to the mechanism. The engagement surfaces of the window panel engagement element and the window panel receiving element are spaced at predetermined distances such that the window bottom is spaced above the window line on the door frame when the window panel is in its raised position.

8 Claims, 2 Drawing Sheets

AUTOMOTIVE WINDOW MOUNTING ASSEMBLY

BACKGROUND OF THE INVENTION

1. The Field of the Invention

This invention relates to an assembly for mounting glass window panels in automobile doors of the type having a peripheral frame extending around the periphery of the door. Specifically, the invention relates to an assembly for mounting the window which allows for the quick assembly of the window panel into the mechanism housed within the door which raises and lowers the window and which assembly places the bottom edge of the window glass above the sill of the window opening when the window is in the fully raised position.

2. Description of the Prior Art

Many difficulties exist in installing and replacing the glass window panels in automobile doors, especially those doors having a peripheral metal frame around the window opening in the door. These problems are compounded by the fact that the regulator mechanism in the door for raising and lowering the window positions the bottom edge of the glass window panel within the door even when the window is in a fully raised position.

This design requires that the glass panel be installed only after the inside panel f the door has been removed. This is because the bottom edge of the window panel glass is provided with a sash channel in which the roller arms of the window regulator are installed. Since the rollers on the window regulator arm must be within the door even when the window is raised, this design necessitates that the bottom edge of the window panel also be within the interior of the door. Consequently, the inner door panel must be removed before installing or replacing the window.

Not only is the replacement of the window made more labor intensive because of the required door disassembly, but an additional problem is caused which arises when the vehicle is involved in a collision from the side. Because the bottom edge of the window panel is housed within the door frame below the sill of the window opening, which sill defines what is known as the "belt line" of the door, a collision produces forces acting on the outer panel of the door and on the mechanism for raising and lowering the window. These forces tend to break at least the lower portion of the window glass panel in the sash area. The transmission of these forces to the lower portion of the window panel is made worse by the now almost universal practice of installing a metal beam across the interior of the door from the side thereof adjacent the front of the vehicle to the side thereof towards the rear of the vehicle. While this beam provides protection to the vehicle occupant from side collisions, it results in higher forces being imparted to the bottom portion of the window panel via the door frame and window regulator even when the window is in its raised position.

The assembly for mounting a window panel of the present invention solves both of the aforementioned problems by having a window panel receiving element fixed to the window panel adapted to resiliently engage an extension on the sash element associated with the window regulator channel mounted within the interior of the door. The assembly includes a window panel receiving element adapted to be fixedly attached to the window panel. The window panel receiving portion of the receiving element is spaced a sufficient distance from a lower portion thereof adapted to resiliently engage the sash and thereby the window regulator, such that the bottom edge of the window panel is above the belt line or sill of the door when the window is in the fully raised position. Thus, should a collision from the side occur, the inward force produced by the movement of the outer door panel is not applied directly against the glass, thereby greatly reducing the forces thereon.

The spacing between the glass receiving portion and the lower resilient portion of the window panel receiving element adapted to engage the sash of the window regulator mechanism is such that when the beam on the interior of the door contacts the window regulator mechanism, such as when the door is hit from the side, it causes bending forces to be developed within the window panel receiving element, causing it to deform. If the glass were within the door, forces would be applied in shear against the bottom edge of the glass. Since, when the window is in the raised position, the top and side peripheral edges thereof are fully contained within the full peripheral frame of the door, there is no possibility that the bottom edge of the glass can be forced into the interior of the vehicle when side forces are applied.

In addition, it can be seen that forming the lower resilient portion of the window panel receiving element as a female receiving portion, in combination with a mating male window engagement element on the sash of the window regulating mechanism, facilitates replacement of the window panel. These two elements allow for the replacement of a window panel by removing the damaged window, normally by rotating the window panel towards the front or rear of the vehicle, while the window regulator is in a partially lowered position. Similarly, a replacement window panel is installed with the female receiving portion of the window panel receiving element resiliently engaging the male window engagement element of the window regulator mechanism, thus obviating the need for removal of the interior panel of the door.

One must be highly sensitive to and understand that an automotive window mounting assembly can, in fact, improve the direct cause and effect relationships existing throughout the entire vehicle glass embodiment and more particularly, to the effect on an occupant sitting behind a raised window panel in a collision. For example, too often in side impact collisions, the glass, even when raised, is broken by cause and effect relationships inherent in the placement and the mounting of the automotive window by its mounting assembly. Thus, in such a collision, the glass panel is "pre-broken" so that should the occupant's head hit the window panel, the result is the occupant's head going out the window. Additionally, if the vehicle is impacted from the side and rolls over onto its side, or even completely over, the strength of the glass is completely lost. This is simply because the glass panel was initially "pre-broken" directly as a cause and effect by the way it was initially mounted and positioned within the door panel. Clearly, the prior art does not address the fact that vehicle window panels must be more forgiving, not only to the result of a glass panel fracturing but equally important, to reduce the incidence of glass panel fracturing in the critical fractions of seconds while a side impact collision is occurring where the individual's head hits the glass panel a fraction of a second after the door panel is crushed. Thus, the automotive window mounting assembly of the present invention can help prevent the potentially harmful effect on the vehicle's occupants caused by the prior art window mounting systems.

SUMMARY OF THE INVENTION

It is an object of the invention to provide an assembly for mounting an automotive window panel within a vehicle door.

It is yet an additional object of the invention to provide an assembly for mounting a window panel in a vehicle door which permits the simple replacement of the window panel and places the bottom edge of the panel above the window sill or belt line when the window is in the raised position.

It is still an additional object of the invention to provide an assembly for mounting a window in an automobile door which is simple in design and easy to fabricate and install.

Accordingly, these objects are achieved by an assembly for mounting a window panel adapted to be raised and lowered by a mechanism mounted within an automobile door. The door is of the type having a peripheral frame extending upwardly from the sill of the window opening and extending completely around the periphery of the window opening. The peripheral frame is slotted to support the periphery of the window panel in a well known manner when the window panel is in the fully raised position. The automobile door is of the type having an outer door panel and an inner door panel, the door panels forming an interior for housing and the window regulating mechanism used to raise and lower the window. Both the outer and inner door panels have complementary ends forming the sill of the window opening. These complementary ends extend inwardly towards the interior of the door at a predetermined vertical distance from the bottom of the door and are spaced a predetermined distance apart, thereby forming a gap through which the window panel may be raised and lowered.

The assembly includes a window panel receiving element having a pair of opposed sides having first ends thereof adapted to be fixedly attached to the respective sides of the window panel. The receiving element is in the form of a generally H-shaped resilient channel wherein the upper U-shaped portion of the H-shaped channel is adapted to receive the window panel and be fixed thereto. The generally U-shaped lower resilient female portion of the H-shaped channel is adapted to resiliently capture a male portion fixed to the sash element of the window regulator mechanism which raises and lowers the window.

The sash element of the window regulator mechanism includes an upwardly extending male window panel engagement element having a pair of tapered surfaces and having a recess or shoulder thereon. The shoulder is adapted to capture cam-shaped surfaces fixed on the inside of the downwardly extending resilient legs of the generally U-shaped lower female portion of the H-shaped channel after these legs have been deflected outwardly by the tapered surface on the window panel engagement element. The cam-shaped surfaces thus spring inwardly and engage the shoulder and couple the window panel to the sash of the window regulating mechanism.

In order to seal around the window in the area of the gap formed between the ends of the inner and outer panels of the door, these ends include a generally downwardly extending flanged portion formed on each of the complementary ends of the inner and outer door panels. The flange portions extend generally downwardly and are inclined towards their respective inner and outer door panels at an angle matching the tapered surfaces of the male window panel engagement element on the sash associated with the window regulating mechanism. Thus, a seal is formed between the lower U-shaped female portion of the window panel receiving element and the complementary ends of the door panels when the window panel is in a raised position. Normally this seal is enhanced by the application of a rubber material on the flanged portions.

DETAILED DESCRIPTION OF THE PREFERRED EMBODIMENT

Figure 1:
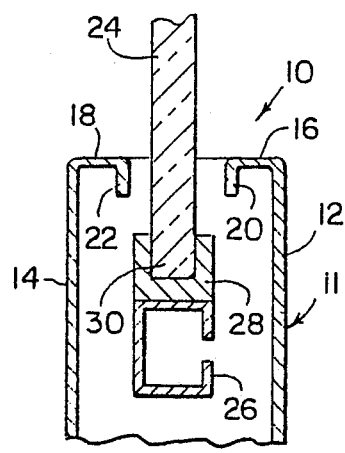
FIG. 1 is a cross-sectional view of an automobile door panel having the prior art window panel mounting system.

Referring to FIG. 1, there is shown the prior art window mounting apparatus, generally denoted as 10, positioned within an automotive vehicle door 11, having an inner panel 12 and an outer panel 14. Panels 12 and 14 include inwardly extending end portions 16 and 18, respectively, which form the sill of the window opening. The end portions include flanges 20 and 22, which are spaced a predetermined distance apart, thereby forming a gap through which a window panel 24 may extend. A conventional window panel 24 is raised and lowered via a window regulator (not shown), which is operatively connected to sash element 26. Sash element 26 is fixedly attached to window panel receiving element 28, which is bonded or otherwise fixedly attached to window panel 24. Thus, sash 26, window panel receiving element 28 and window panel 24 form an integral unit which may be raised and lowered by the window regulator mechanism. Since sash 26 must remain within the vehicle door even when window panel 24 is in its fully raised position, this results in the bottom 30 of window panel 24 being within the vehicle door at all times.

Figure 3:
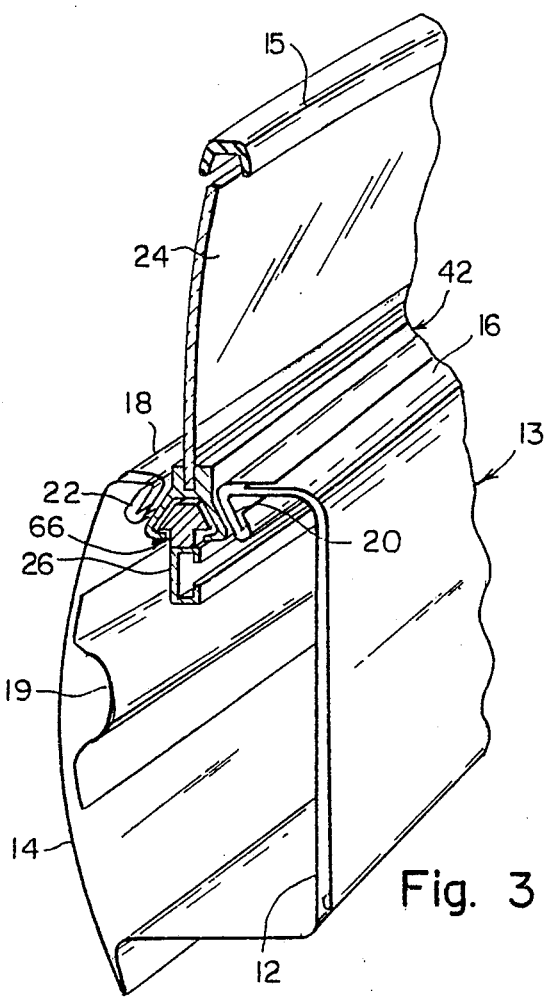
FIG. 3 is a partial cross sectional isometric view of the door panel shown in FIG. 2 along the lines 3—3.
Figure 2:
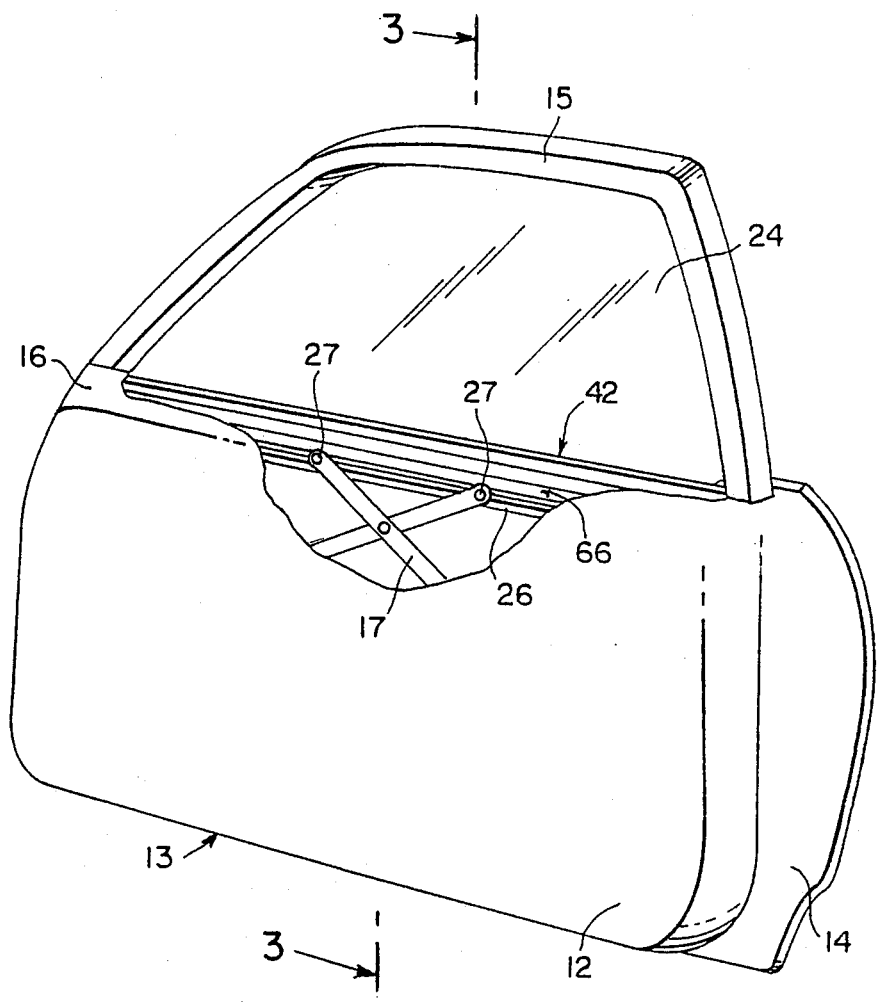
FIG. 2 is a side view of the inner side of an automobile door having the assembly for mounting a window panel of the present invention.

Referring to FIGS. 2 and 3, there is shown an automotive door generally denoted as 13 utilizing the window panel mounting apparatus of the present invention. For purposes of simplicity, identical parts of the door of the prior art and the door 13 will have identical reference numerals. Thus, the door again has an inner panel 12 and an outer panel 14 with complementary ends 16 and 18, having inwardly extending flanges 20 and 22, respectively. However, in one embodiment of the present invention, the inwardly extending flanges are angled away from the interior of the door for reasons which will be discussed in more detail below. As in the prior art, window panel 24 extends through a gap of predetermined size between the inwardly extending flanges 20 and 22. Also, a sash 26 is operatively coupled to and forms part of the standard window regulating mechanism 17.

Typically, automotive vehicle door 13 is of the type having a peripheral frame 15 extending entirely around the window opening formed within door 13. A conventional window regulator mechanism 17 is mounted within door 13 and engages sash element 26 via rollers 27 in a well-known manner. Door 13 includes inner panel 12 and outer panel 14, with outer panel 14 being stiffened by a beam member 19.

Figure 4:
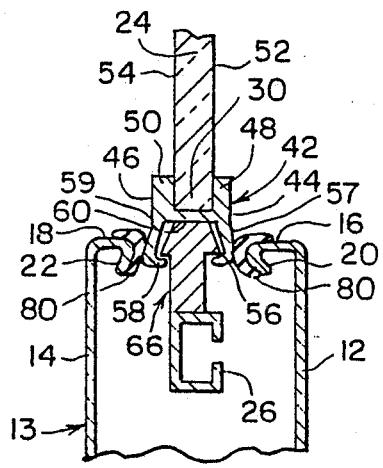
FIG. 4 is a partial side elevational view of the window panel mounting assembly shown in FIG. 3.
Figure 5:
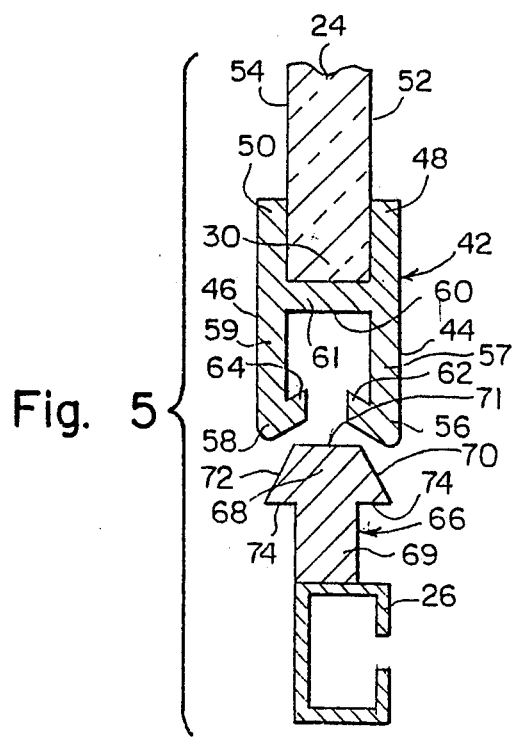
FIG. 5 is an enlarged cross-sectional view of the window panel mounting assembly prior to coupling the window panel to the window regulator mechanism.

Referring to FIGS. 4 and 5, the mounting assembly of the present invention includes a generally H-shaped window panel receiving element 42, having a pair of opposed sides 44 and 46. Sides 44 and 46 have first upper ends 48 and 50, respectively, which ends extend parallel to and are attached to the inner and outer sides 52 and 54 of window panel 24. As in the prior art, this attachment may be made through any variety of well-known adhesives which serve to not only bond window panel receiving element 42 to the window panel 24, but also form a weather seal therebetween.

Opposed sides 44 and 46 of window panel receiving element 42 include lower legs 57 and 59 having second ends 56 and 58 which are spaced a predetermined distance from ends 48 and 50. Window panel receiving element 42 further includes a cross-bar 61 which extends between opposed sides 44 and 46, thus providing window panel receiving element 42 with its generally H-shaped cross-section. The downwardly facing generally U-shaped female portion of receiving element 42, defined by cross-bar 61 and the ends 56 and 58 of the lower legs 57 and 59 of opposed sides 44 and 46, includes inwardly extending cam elements 62 and 64, respectively. Opposed sides 44 and 46 are manufactured in such a way and of such a flexible material that lower legs 57 and 59 thereof may be resiliently sprung outwardly.

Again referring to FIG. 5, it can be seen that integrally formed with sash element 26 is a male window panel engagement element 66 extending along the entire length of sash element 26. Element 66 may be fixedly attached to sash 26, preferably by a mechanical attachment, such as by rivets or screws (not shown), or may be formed integrally therewith. Window panel engagement element 66 includes a generally trapezoidal tapered upper portion 68 having a base including a pair of recesses or shoulders 74 and a pair of inclined side surfaces 70 and 72 extending upwardly and inwardly from shoulders 74 at a predetermined angle. Shoulders or recesses 74 extend along both sides of the window panel engagement element 66 along the entire length thereof. Preferably, window panel receiving element 42 runs almost the entire length of window panel 24 and the length of male window panel engagement element 66 is equal to the length of the sash element 26 which length is determined by the type of window regulating mechanism 17 used.

Window panel engagement element 66 also includes a lower portion 69, narrower than and coupled to the base of trapezoidal upper portion 68, the bottom of which is attached to sash element 26 as described above. The height of lower portion 69 determines the distance from sash 26 to the bottom 60 of cross-bar 61 of window panel receiving element 42. When the window regulator raises window panel 24, element 66 first moves upwardly until surface 71 thereof contacts bottom surface 60 of cross-bar 61 of element 42, and then the window panel 24 is raised. When the window regulator is lowered, shoulders or recesses 74 engage cam elements 62 and 64 and pull the window down.

To mount a window panel utilizing the assembly of the present invention, a window panel 24 having window panel receiving element 42 fixedly attached thereto is slid within the predetermined gap formed by flanges 20 and 22 of inner and outer door panels 12 and 14. Window regulator 17, and consequently sash element 26 and window panel engagement element 66, are placed in a partially raised position within the door. Window panel 24 is then inserted within the gap formed between flanges 20 and 22, normally at an angle with respect to the front or the rear of the door, in a manner wherein the lower female U-shaped portion of window panel receiving element 42 can receive male window panel engagement element 66.

Upon insertion, cam elements 62 and 64 engage tapered surfaces 70 and 72 of the outwardly tapered upper portion 68 of window panel engagement element 66. This engagement resiliently deflects legs 57 and 59 of opposed sides 44 and 46 outwardly such that cam elements 62 and 64 are slid along tapered surfaces 70 and 72 until shoulders or recesses 74 are encountered. At this point, cam elements 62 and 64 and, consequently, ends 56 and 58, spring inwardly, thereby capturing window panel 24 onto the window panel engagement element 66. Normally, this assembly technique can be accomplished without having to remove the inner panel 12 of door 13, which would be the case in removing a window panel using the mounting apparatus of the prior art.

Should window panel 24 have to be replaced, the window is put in a partially lowered position and rotated with sufficient force in the front-to-rear direction of the door such that cam elements 62 and 64 downwardly deflect away from and disengage from shoulder 74 of element 66. Even should cam elements 62, 64 break upon removal, this is of no consequence since window panel receiving element 42 is designed to be discardable along with the broken window and a new element 42 is provided fixedly attached to the new window panel 24.

Referring to FIGS. 3–5, it can be seen that the window panel mounting apparatus of the present invention differs from the window panel mounting apparatus of the prior art in that instead of being integral, elements 42 and 66 are adapted to engage in a manner to facilitate initial assembly of window panel 24 into door 13 and also facilitate the replacement thereof.

Referring to FIGS. 3 and 4, an additional feature of the present invention may be viewed. Specifically, flanges 20 and 22 of inner and outer door panel 12 and 14 may extend downwardly and be outwardly inclined towards their respective panels at an angle generally complementary to the surfaces 70 and 72 of window panel engagement element 66. When window panel 24 is assembled to sash element 26 via elements 42 and 66, the resilient lower legs 57 and 59 of opposed sides 44 and 46 of the lower female U-shaped portion take on a generally outwardly tapered shape corresponding to the taper of surfaces 70 and 72 after full engagement of cam surfaces 62 and 64 under shoulder 74. By making complementary end flanges 20 and 22 extend parallel to tapered surfaces 70 and 72 of window panel receiving element 42, it can be seen that when the window panel is in the raised position, the lower legs 57 and 59 of opposed surfaces 44 and 46 of the lower female U-shaped portion cooperate with flanges 20 and 22 to form a seal, thereby preventing water from entering the interior of the door. This seal may be enhanced by including an outer rubber strip 80 on either of legs 57 and 59 or on the complementary surfaces of flanges 20 and 22 (as shown in FIG. 4).

It is contemplated that the length of extension 69 on element 66 and the geometry of element 42 is such that when the window regulator 17 raises the sash element 26 to its uppermost position as when the window panel 24 is in the fully closed position, the bottom edge 30 of the window panel is located above the sill or belt line defined by the upper surfaces of inwardly extending flanges 16 and 18 of inner and outer door panels 12 and 14. Thus, cross bar 61 would be spaced upwardly from the sill or belt line of the door, with the height of lower portion 69 determining the position of the sash element 26 within door 13. In the fully raised position, the top surface 71 of window panel engagement element 66 impinges on the bottom surface 60 of cross bar 61, thus tightly holding the window in the closed position.

While one embodiment of the present invention has been described, and/or shown, it is obvious that many changes and modifications may be made thereunto without departing from the spirit and scope of the invention.

What is claimed is:

1. A window panel mounting assembly for operatively coupling a window panel having a bottom edge to a mechanism for raising and lowering the window panel within an automobile door of the type having a peripheral frame extending upwardly from a window sill line thereon to define a window opening, the peripheral frame adapted to support the top and side peripheral edges of the window panel when the window panel is in a fully raised position, said assembly, comprising:

a sash element capable of being operatively coupled to the mechanism for raising and lowering the window;

an upwardly extending window panel engagement element fixedly attached to said sash element and extending upwardly therefrom, said window panel engagement element having a cam surface thereon having a predetermined width and including a pair of inwardly extending shoulders thereon;

a window panel receiving element having a pair of opposed sides having first ends thereof fixedly attached to an inner and outer side of the window panel along the bottom edge thereof, said opposed sides of said receiving element having resilient second ends extending downwardly from the bottom edge of said window panel and defining a receiving portion spaced a predetermined distance to resiliently deflect outwardly upon engaging said cam surface of said upwardly extending window panel engagement element; and cam means formed on said second ends of said opposed sides of said window panel receiving element for resiliently capturing said shoulder on said upwardly extending window panel engagement element.

2. The assembly as set forth in claim 1, wherein said opposed sides of said window panel receiving element are joined by a cross-bar having an upper side thereof fixedly attached to the bottom edge of the window panel, said cross-bar forming an upper generally U-shaped channel including said first ends of said opposed sides and a lower, downwardly facing generally U-shaped channel, the opposed sides of said downwardly facing, generally U-shaped channel forming said second ends of said opposed sides, including said cam means for resiliently capturing said shoulders on window panel engagement element.

3. The assembly as set forth in claim 1, wherein said window panel engagement element has a trapezoidal upper portion having said cam surfaces formed on the inwardly extending sides of said trapezoid and a lower portion formed integral with the base of said trapezoid but having a width less than said base to define said inwardly extending shoulders.

4. The assembly as set forth in claim 3, wherein said trapezoidal upper portion of said window panel engagement element has an upper surface thereon adapted to engage a lower side of said cross-bar of said window panel receiving element when said window panel is being raised by the mechanism for raising and lowering the window panel and said lower portion of said window panel engagement element extends upwardly from said sash element a distance sufficient to place the bottom edge of the window panel above the sill line when the mechanism for raising and lowering the window panel is in a fully raised position.

5. The assembly for mounting a window panel as set forth in claim 1, wherein said window panel engagement element has an upper portion including said pair of inwardly extending shoulders and includes a pair of inclined surfaces extending upwardly and inwardly from said shoulders at a predetermined angle, said second ends of said opposed sides of said window panel receiving element including a pair of resilient leg elements extending downwardly from and generally parallel to said inner and outer side of said window panel and having said cam means thereon, said cam means having camming surfaces thereon capable of being resiliently deflected outwardly upon engaging said inclined surfaces on said window panel engagement element and springing inwardly and engaging said inwardly extending shoulders, thereby coupling the window panel to said mechanism for raising and lowering thereof.

6. The assembly a set forth in claim 5, wherein the automobile door has an inner door pane and an outer door panel, said door panels forming an interior for housing the mechanism for raising and lowering the window panel, said inner and outer door panels having complementary ends extending inwardly towards the interior of the automobile door to form the window sill line of the window opening, each of said complementary ends of said door panels including generally downwardly extending flanged portions formed thereon, said downwardly extending flange portions being inclined towards their respective inner and outer door panels at an angle equal to said predetermined angle of said pair of inclined surfaces on said window panel engagement element.

7. An assembly for mounting a window panel having a bottom edge operatively coupled to a mechanism for raising and lowering the window panel mounted within an automobile door of the type having an outer door panel and an inner door panel said door panels forming an interior for housing said mechanism for raising and lowering the window panel, the inner and outer door panels having complementary ends extending inwardly towards the interior of said door forming a window sill at a predetermined vertical distance above a bottom of the door and the complementary ends spaced a predetermined distance apart, to form a gap through which said window panel may be raised and lowered, said assembly comprising:

an upwardly extending window panel engagement element capable of being operatively coupled to the mechanism for raising and lowering the window panel, said window panel engagement element having a pair of upwardly inclined converging surfaces inclined at a predetermined angle and having recesses therein;

a window panel receiving element having a pair of opposed sides, each having first ends thereof fixedly attached to respective inner and outer sides of said window panel along the bottom edge thereof, said opposed sides of said receiving element having resilient second ends extending downardly from the bottom edge of said window panel and defining a receiving portion;

camming surfaces on said second end of each opposed side of said window panel receiving element, said camming surfaces spaced a predetermined distance apart to be resiliently deflected outwardly by said inclined surfaces on said window panel engagement element and springing inwardly upon engaging said recess to thereby capture said window panel engagement element and couple the window to said mechanism for raising and lowering the window; and a generally downwardly extending flanged portion formed on each of the complementary ends of said inner and outer door panels, said generally downwardly extending flange portions being downwardly inclined towards their respective inner and outer panels of said door at an angle equal to said predetermined angle of said inclined surface of said window panel engagement element and capable of forming a seal therebetween when the window panel is in a raised position.

8. A window panel mounting assembly for operatively coupling a window panel having a bottom edge to a mechanism for raising and lowering the window panel, the mechanism for raising and lowering the window panel being mounted within an automobile door of the type having a peripheral frame extending upwardly from a window sill line thereon to define a window opening, the peripheral frame adapted to support the top and side peripheral edges of the window panel when the window panel is in a fully raised position, said assembly comprising:

a window panel receiving element coupled to the bottom edge of the window panel and extending downwardly therefrom;

a window panel engagement element capable of being operatively coupled to the mechanism for raising and lowering the window panel and extending upwardly therefrom; and means formed on each of said window panel receiving element and said window panel engagement element for lockingly coupling said elements upon contact therebetween, thus operatively coupling the window panel to the mechanism for raising and lowering the window panel for movement therewith.

* * * * *